July 4, 1950 M. M. LEVY 2,513,947
MULTICHANNEL SIGNALING SYSTEM
Filed Oct. 21, 1948
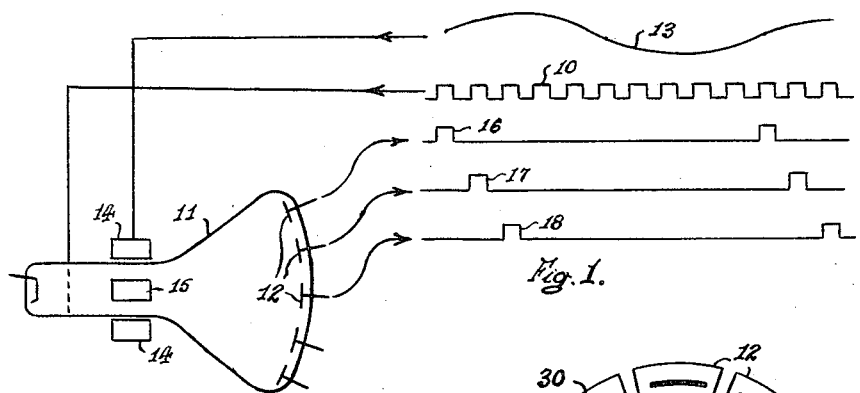
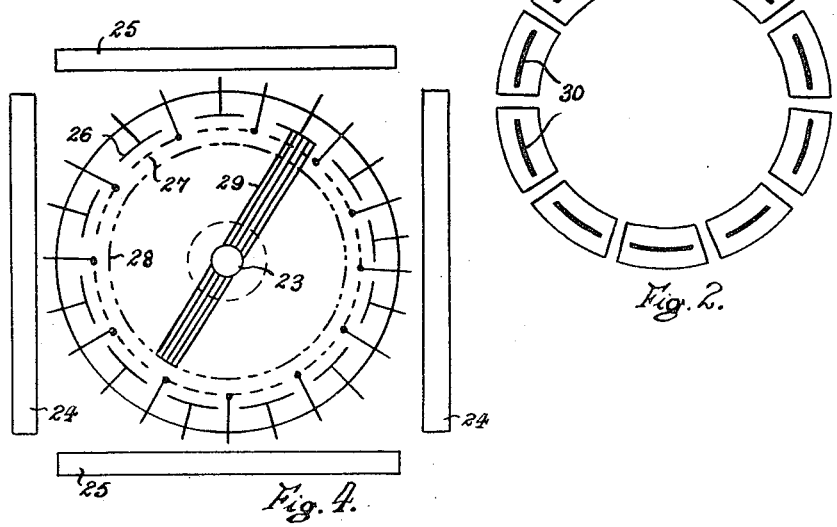
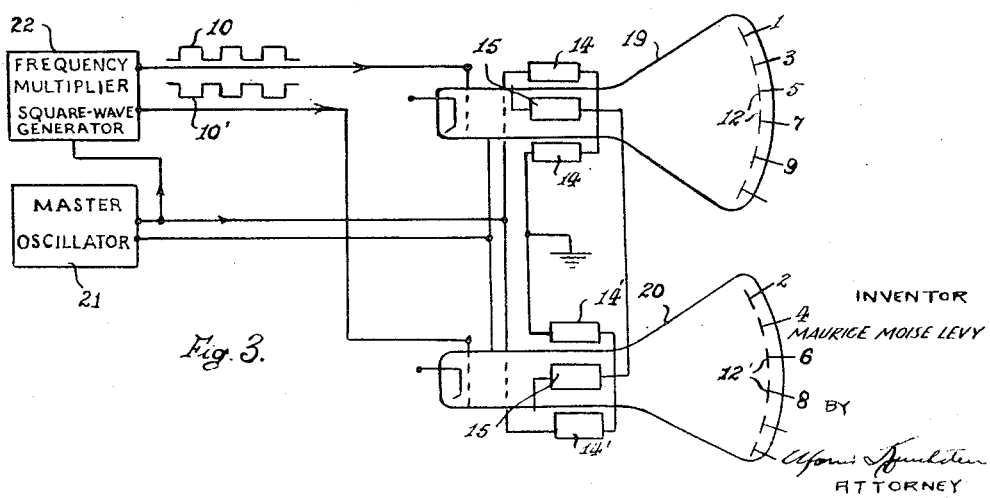
INVENTOR
MAURICE MOISE LEVY
BY
ATTORNEY Patented July 4, 1950

2,513,947

UNITED STATES PATENT OFFICE 2,513,947

MULTICHANNEL SIGNALING SYSTEM

Maurice Moise Levy, Earls Court, England, assignor to The General Electric Company, Limited, London, England Application October 21, 1948, Serial No. 55,733
In Great Britain August 14, 1946

8 Claims. (Cl. 315—9)

The present invention relates to distributors for example for multi-channel signalling systems, telegraph systems and for other purposes. It is applicable for example to multi-channel signalling systems of the kind in which each channel is constituted by a train of pulses modulated in accordance with intelligence to be transmitted, the trains of pulses being of the same recurrence frequency and interleaved with one another. Thus in a system with $n$ channels, the pulses of each train are usually time-delayed by $$\frac{1\text{th}}{n}$$

of a recurrence period relatively to the pulses of the preceding train. Modulation may for example be by width (i. e. duration of pulse) or time (i. e. instant of occurrence of pulse) and in either case it is arranged that each pulse remains within its allotted fraction of the recurrence period. In other words overlapping of pulses of one channel with those of an adjacent channel is avoided in order to prevent cross-talk.

In systems of the kind set forth it is necessary to generate trains of pulses which are related in the manner described either to constitute the pulses which are modulated or to constitute channel width defining pulses, for locating the modulated pulses in and confining them to, their appropriate channels. For this purpose what is known as a distributor may be employed. One known form of distributor is in the form of a cathode ray tube having a plurality of anodes each connected with a different channel. The cathode ray is caused, by suitable deflecting means, to sweep over the anodes in turn and to complete the traverse of all the anodes in the desired pulse recurrence period. The required pulses are then generated at the individual anodes.

With this known form of distributor the shapes of the pulses generated are dependent upon the shape of the spot produced by the cathode ray upon the anodes and upon the shapes and dispositions of the anodes themselves and it is usually necessary that the pulses should be of well-defined shape in order that the channel widths may be well-defined. It has therefore been necessary to employ a well focused cathode ray beam, which usually involved high voltages, and a carefully constructed cathode ray tube.

It is the object of the present invention to avoid the need for accurate beam focusing and tube construction in distributors for multi-channel signalling and other purposes.

According to the present invention a distributor for multi-channel signalling and other purposes comprises a cathode ray tube having a plurality of anodes, means for causing the cathode ray to sweep over the anodes in turn and means for applying to an electrode of the tube an oscillation which alternately permits and substantially prevents the passage of electrons of the beam to the anodes, the frequency and phase of the oscillation in relation to the shape, size and disposition of the anodes and the frequency and phase of the sweeping movement of the cathode ray being such that electrons first reach each anode at a region away from the leading edge thereof and are substantially prevented from reaching each anode before the beam has reached the trailing edge of such anode, whereby the wave form of the pulses developed at the anodes is independent of the shapes of the anodes. The leading and trailing edges of the anodes are those edges at which the beam approaches and leaves the anodes respectively.

The invention will be described by way of example with reference to the accompanying drawing in which Figure 1 is a diagrammatic illustration of one embodiment suitable for use in a multi-channel signalling system;

Figure 2 is a front elevation of the anodes of the distributor of Figure 1,

Figure 3 shows a modification of the arrangement of Figure 1 employing two distributors, and Figure 4 shows a part of an alternating form of distributor according to the invention.

Referring to Figures 1 and 2, an oscillation of rectangular wave form indicated at 10 and of a frequency 100 kc./s. is applied to the control grid of a cathode ray tube 11 having ten anodes 12 arranged symmetrically with respect to the tube axis and in a circle. The cathode ray beam is arranged to be cut-off during the negative half cycles of the oscillation and switched on during the positive half cycles of the oscillation 10. Two sinusoidal deflecting currents of the wave form indicated at 13, of 10 kc./s. and mutually phase displaced by 90° are applied to two mutually perpendicular pairs of deflecting coils 14 and 15 to serve to deflect the cathode ray in a circular track over the anodes. The oscillations of 100 and 10 kc./s. are derived from a common source and their phase relation and the positions of the coils and anodes are such that when the beam is switched on by each positive half-cycle of the 100 kc./s. oscillation it is in a position within the surface of one of the anodes and that before it leaves that surface it has been switched off by the negative half-cycle. The areas on the anodes which may be arranged to receive electrons are indicated at 30 in Figure 2.

In this way there is generated at each anode a pulse train having pulses of rectangular wave form defined by the wave-form of the 100 kc./s. oscillation and a recurrence frequency of 10 kc./s. The trains generated at three of the anodes 12 are indicated at 16, 17 and 18. The pulses of consecutive trains are spaced apart by 10 microseconds.

It is desirable that the space between the positive half-cycles of the 100 kc./s. oscillation should be as great as possible and nevertheless it may be desired to provide more channels than would be possible with the arrangement described. In this case, as shown in Figure 3, use may be made of two like cathode ray tubes 19 and 20. Assuming the same frequencies as have been described in connection with Figure 1, a master oscillator 21 at 10 kc./s. serves to synchronise a frequency multiplier and square wave generator 22 which furnishes oscillations 10 and 10' at 100 kc./s. The oscillations 10 and 10' are seen to be displaced in phase by 180° relatively to one another and they are fed respectively to the control grids of the two tubes 19 and 20. Sinusoidal oscillations from the master oscillator 21 are applied to the deflecting coils 14, 15, 14', 15' of the two tubes as in the arrangement of Figure 1 and serve to cause the cathode rays to sweep over the two sets of anodes 12 and 12' in synchronism.

Each anode is associated with a different transmission channel and channels which are consecutive in time are given consecutive reference numbers 1, 3, 5 etc., for the tube 19 and 2, 4, 6 etc. for the tube 20. Means may be provided for displacing the deflecting coils and the tubes with which they are respectively associated relatively to one another in order to adjust the phases.

So long as the phasing of the oscillations 10 and 10' relatively to that of the deflecting currents and to the positions of the anodes is correctly adjusted within suitable limits (the adjustment is not critical), it will be evident that the waveform of the pulses at the anodes can be made independent of the shapes and dispositions of the anodes and the precise phasing of the beam rotation. The tubes 19 and 20 do not, therefore, require to be constructed with a high degree of accuracy.

The invention can be applied to a known form of electronic distributor described in Bell Technical Journal, April 1944, pages 190–202, in which a relatively long cathode is used and is surrounded by a number of electrodes or groups of electrodes. The application of the invention to this type of tube will be described with reference to Figure 4. A flat beam of electrons 29 from the whole length of a cathode 23, which is elongated in a direction perpendicular to the plane of the paper, is caused to rotate by means of a rotating magnetic field generated by suitable currents in coils 24 and 25 which generated two mutually perpendicular rotating magnetic fields and to co-operate in turn with each of a number of groups of electrodes each of which co-operates with a different channel. Each said group of electrodes comprises in this example, an anode 26 constituting an output electrode, a control grid 27 to which modulating signals are applied and a screening electrode permeable by electrons only in regions opposite the anodes. Each group then constitutes in turn with the cathode 23 a thermionic valve.

An oscillation, preferably of rectangular wave form as at 10 in Figure 1, is applied to a common control grid 28 surrounding the cathode 23 and serves to modulate the electron beam throughout its travel around the groups of electrodes.

The invention is also applicable where the anodes are not arranged in a circle. For instance they may be arranged in one or more straight lines and the beam movement may then be a to and fro one. Instead of the beam being of such cross section as to produce a round spot as assumed in the description of Figures 1 and 2, it may have a cross section which is somewhat elongated in a radial direction with respect to its track. Moreover it may be in the form of a double pencil each pencil having a circular or a radially elongated cross section, and two concentric rows (or two parallel lines) of anodes may be provided to cooperate with the two pencils respectively.

With the arrangement so far described, the said oscillation produces negative pulses upon the anodes as it sweeps over them. If desired positive pulses can be produced by making use of secondary emission, from the anode, a suitable collecting electrode being provided for the secondary electrons and maintained at a suitably higher potential than the anodes. Such collecting electrode may be constituted by a conductive annular coating around the inner surface of the envelope of the cathode ray device and arranged symmetrically with respect to all the anodes. The secondary emission is, of course, arranged to exceed the primary electron current causing the secondary emission.

I claim:

1. A distributor comprising a cathode ray tube having a plurality of spaced anodes, means for sweeping the cathode ray beam over said anodes in succession to generate electron current therein, an electrode for controlling the intensity of said beam, means for generating an oscillation having a period equal to the time between successive engagements of said beam with a central region of successive ones of said anodes and means for applying said oscillation to said electrode to control the wave form of said electron currents.

2. A distributor comprising a cathode ray tube having a plurality of spaced anodes, means for sweeping the cathode ray beam over said anodes, in succession to generate electron current therein, each said anode having a leading edge on the side thereof at which said beam approaches the anode and a trailing edge of the side of the anode at which the beam leaves the anode and means for switching said beam on and off at regions of each said anode situated between and away from said leading and trailing edges.

3. A distributor comprising a cathode ray tube having a plurality of spaced anodes, means for sweeping the cathode ray beam over said anodes in succession to generate electron current therein, an electrode for controlling the intensity of said beam, means for generating an oscillation of substantially rectangular wave form and means to apply said oscillation to said electrode to determine the wave form of each said electron current.

4. A distributor comprising a cathode ray tube having a plurality of spaced anodes arranged around a circular annulus, means for deflecting the cathode ray beam in a conical path to engage said anodes in succession and means for switching said beam on and off at regions of each anode away from edges thereof.

5. A distributor comprising a cathode ray tube having an elongated cathode and a plurality of anodes disposed substantially in a cylindrical surface surrounding said cathode and co-axial therewith, means for directing electrons in a flat beam from said cathode to said anodes, means for rotating said beam about the axis of said cathode to engage said anodes successively and means for switching said beam on and off at regions of each anode away from edges thereof.

6. A distributor according to claim 5, wherein said switching means comprise a control electrode between said cathode and anode and means for applying oscillations to said control grid.

7. A distributor system comprising two cathode ray tubes, each having a plurality of spaced anodes and means for deflecting the cathode ray beam to engage the anodes of said tubes alternately, means for applying to one of said tubes an oscillation to switch the beam of said tube on and off, and means for applying to the other of said tubes an oscillation of substantially opposite phase to said first oscillation to switch the beam of the other of said tubes on and off, the beam in one tube being switched on when that in the other tube is switched off.

8. A distributor system comprising two cathode ray tubes, each having a plurality of spaced anodes and means for deflecting the cathode ray beam to engage the anodes of said tubes alternately, means for applying to one of said tubes an oscillation to switch the beam of said tube on and off at the regions of each anode away from edges thereof, and means for applying to the other of said tubes an oscillation of substantially opposite phase to said first oscillation to switch the beam of the other of said tubes on and off at the regions of each anode away from edges thereof, the beam in one tube being switched on when that in the other tube is switched off.

MAURICE MOISE LEVY.

REFERENCES CITED

The following references are of record in the file of this patent:

UNITED STATES PATENTS

| Number | Name | Date |
|---|---|---|
| 1,977,398 | Morrison | Oct. 16, 1934 |
| 2,121,359 | Luck et al. | June 21, 1938 |
| 2,178,074 | Jakel et al. | Oct. 31, 1939 |
| 2,186,388 | Moritz, Jr. | Jan. 9, 1940 |
| 2,241,809 | De Forest | May 13, 1941 |
| 2,265,848 | Lewis | Dec. 9, 1941 |
| 2,302,311 | Goldsmith | Nov. 17, 1942 |
| 2,426,208 | Hardy | Aug. 26, 1947 |
| 2,455,456 | Whittaker | Dec. 7, 1948 |